(12) United States Patent
Pflibsen

(10) Patent No.: US 6,604,366 B1
(45) Date of Patent: Aug. 12, 2003

(54) SOLID CRYOGEN COOLING SYSTEM FOR FOCAL PLANE ARRAYS

(75) Inventor: Kent P Pflibsen, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/247,195

(22) Filed: Sep. 19, 2002

(51) Int. Cl.⁷ .............................................. F17C 13/08
(52) U.S. Cl. ........................ 62/53.2; 62/54.2; 62/54.3
(58) Field of Search ................................ 62/46.1, 47.1, 62/48.1, 53.2, 54.2, 54.3, 601

(56) References Cited

U.S. PATENT DOCUMENTS

| | | | |
|---|---|---|---|
| 5,382,797 A | * 1/1995 | Kunimoto et al. | 250/352 |
| 5,974,808 A | * 11/1999 | Mangano et al. | 62/51.2 |
| 6,070,414 A | * 6/2000 | Ross et al. | 62/51.1 |
| 6,374,619 B1 | * 4/2002 | Bessendorf | 62/51.2 |

* cited by examiner

Primary Examiner—Denise L. Esquivel
Assistant Examiner—Malik N. Drake
(74) Attorney, Agent, or Firm—Thomas J. Finn; Colin M. Raufer; Glenn H. Lenzen, Jr.

(57) ABSTRACT

A cryogenic cooling system (12) for cooling electromagnetic energy detectors (50). The cooling system (12) includes a first mechanism (18) that accommodates cryogen fluid in one or more spaces (58, 60). A second mechanism (16, 42) freezes the cryogen fluid in the one or more spaces (58, 60) adjacent to the electromagnetic energy detectors (50). In a specific embodiment, the electromagnetic energy detectors (50) comprise an infrared focal plane array (50). The second mechanism (16, 42) includes a heat exchanger (16) that is mounted separately from the first mechanism (18). The one or more spaces (58, 60) are fitted with three-dimensional cooling interface surfaces (62, 64). The three-dimensional cooling surfaces (62, 64) are implemented via a thermally conductive matrix (62, 64). The thermally conductive matrix (62, 64) is a copper metal matrix or carbon/graphite matrix, and the solid cryogen reservoir (18) is a beryllium reservoir (18). The solid cryogen reservoir (18) includes integrated mounting features (52, 54) for mounting the reservoir (18) to a missile housing and a surface for attaching the focal plane array (50) to the reservoir (18). The second mechanism (16, 42) includes a Joule-Thomson orifice (42) that employs the Joule-Thomson effect to cool the cryogen fluid to a solid state. The first mechanism (18) includes a selectively detachable cryogen canister that provides pressurized cryogen fluid to the heat exchanger (16). The heat exchanger (16) directs cooled pressurized cryogen fluid to the solid cryogen reservoir (18) and Joule-Thomson orifice (42) and is positioned remotely from the cryogen reservoir (18). In an illustrative embodiment, the heat exchanger (16) outputs cooled cryogen gas to plural solid cryogen reservoirs (18) to cool plural corresponding infrared focal plane arrays (50). A line cutter selectively detaches the gas canister and/or the heat exchanger (16) from the missile in response control signal from a computer. The computer generates the control signal after a predetermined amount of the cryogen fluid is present in the cryogen reservoir (18) or after a predetermined time interval.

30 Claims, 3 Drawing Sheets

SOLID CRYOGEN COOLING SYSTEM FOR FOCAL PLANE ARRAYS

BACKGROUND OF THE INVENTION

1. Field of Invention

This invention relates to cooling systems. Specifically, the present invention relates to cryogenic cooling systems for cooling focal plane arrays.

2. Description of the Related Art

Cryogenic cooling systems are employed in various demanding applications including military and civilian active and remote sensing, superconducting, and general electronics cooling. Such applications often demand efficient, reliable, and cost-effective cooling systems that can achieve extremely cold temperatures below 80 degrees Kelvin.

Efficient cryogenic cooling systems are particularly important in sensing applications involving high-sensitivity infrared focal plane arrays of electromagnetic energy detectors (FPA's). An FPA may detect electromagnetic energy radiated or reflected from a scene and convert the detected electromagnetic energy into electrical signals corresponding to an image of the scene. To optimize FPA imaging performance, any FPA detector nonuniformities, such as differences in individual detector offsets, gains, or frequency responses, are corrected. Any spatial or temporal variations in temperature across the FPA may cause prohibitive FPA nonuniformities.

FPA's are often employed in missile targeting applications, where weight, size, and spatial and temporal uniformity of cryogenic cooling systems are important design considerations. An FPA must operate at stable cryogenic temperatures for maximum performance and sensitivity.

Conventionally, a cooling fluid is applied to the FPA via a cooling interface. Heat is transferred to the cooling fluid from the FPA. The heated fluid is then expelled from the missile or re-cooled via a heat exchanger integrated into the FPA. The cooling fluid requires a heavy and bulky FPA cooling interface and heat exchanger, which are attached to the FPA mounting assembly. Consequently, the FPA assembly must have additional mechanical support to secure the interface, heat exchanger, and cooling fluid. The bulky components and additional support hardware may require additional cooling, which increases demands placed on the cooling system. The bulky support structure, conventionally thought to improve temperature stability, may conduct excess heat from the warm missile body into the FPA, thereby reducing system cooling efficiency. Furthermore, the additional bulky mechanical FPA support hardware may cause alignment problems with the on board optical or infrared system during installation and operation, thereby increasing installation and operating costs. In addition, missile maneuvering may cause the cooling liquid to slosh in the cooling interface, creating undesirable temperature instabilities.

Alternatively, Joule-Thompson cycle coolers are employed. A Joule-Thomson cycle cooler typically applies a regulated flow of cold gas over the infrared FPA. However, Joule-Thompson cycle coolers require undesirably expensive and bulky compressed gas canisters that must remain on the missile, aircraft, or other system. The additional weight increases the overall operating costs and reduces maneuvering capability and range of the accompanying system. Furthermore, excessive shock or vibration environments from missile maneuvering may interrupt gas flow, thereby creating potentially prohibitive temperature instabilities, resulting in reduced missile performance.

To address size and cost issues associated with using gas canisters, compressors, or other heat exchangers, more advanced construction materials are under continual development. In addition, researchers are attempting to design FPA's with reduced cooling requirements. Unfortunately, this has matured slowly and does not promise satisfactory solutions for high performance applications in the foreseeable future.

Hence, a need exists in the art for an efficient cryogenic cooling system for uniformly cooling an infrared FPA. There exists a further need for a cryogenic cooling system that efficiently employs a solid cryogen to cool an FPA with minimal weight and size impact.

SUMMARY OF THE INVENTION

The need in the art is addressed by the cryogenic cooling system for cooling electromagnetic energy detectors of the present invention. In the illustrative embodiment, the inventive system is adapted to cool infrared focal plane arrays. The system includes a first mechanism for accommodating cryogen fluid in one or more spaces. A second mechanism freezes the cryogen fluid in the one or more spaces adjacent to the electromagnetic energy detectors.

In a more specific embodiment, the electromagnetic energy detectors comprise one or more focal plane arrays. The second mechanism includes a heat exchanger that is mounted separately from the first mechanism. The one or more spaces are fitted with three-dimensional cooling interface surfaces. The first mechanism includes a solid cryogen reservoir having a thermally conductive matrix for implementing the three-dimensional cooling surfaces. The thermally conductive matrix is a copper, graphite, or beryllium matrix, and the solid cryogen reservoir is a beryllium reservoir.

The solid cryogen reservoir includes one or more mounting features for mounting the reservoir and has a surface for mounting the focal plane array on the reservoir. The second mechanism includes a mechanism for employing the Joule-Thomson effect (also called the Joule-Kelvin effect) to cool the cryogen fluid to a liquid state. The first mechanism includes a selectively detachable cryogen canister for providing pressurized cryogen fluid to the heat exchanger.

In an illustrative embodiment, the heat exchanger outputs cooled cryogen gas to plural solid cryogen reservoirs to cool plural corresponding infrared focal plane arrays. The cryogenic cooling system is mounted on or within a missile system. The cryogenic cooling system is connected to a cryogen canister and a heat exchanger for providing the cryogen fluid to a cryogen reservoir with three-dimensional cooling surfaces. A Joule-Thomson orifice employs the Joule-Thomson effect to create the cryogen fluid output from the heat exchanger.

The heat exchanger, which is positioned separately from the reservoir, employs a conduit to direct the fluid to the cryogen reservoir. An additional mechanism selectively detaches the gas canister and/or the heat exchanger from the missile after a predetermined amount of the fluid is collected within the cryogen reservoir or after a predetermined time interval.

The novel design of the present invention is facilitated by the second mechanism, which freezes cryogen in a cooling interface adjacent to a focal plane array. Freezing the cryogen enables remote positioning of the heat exchanger relative to the cooling interface. The cooling interface and accompanying focal plane array assembly no longer require mounting of the heat exchanger in the same assembly to increase the temperature stability of the focal plane array. The frozen cryogen in combination with the efficient solid cryogen cooling interface of the present invention provides sufficient temperature stability. Consequently, costs, cooling inefficiencies, and sensor alignment problems associated with conventional cooling systems are avoided.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
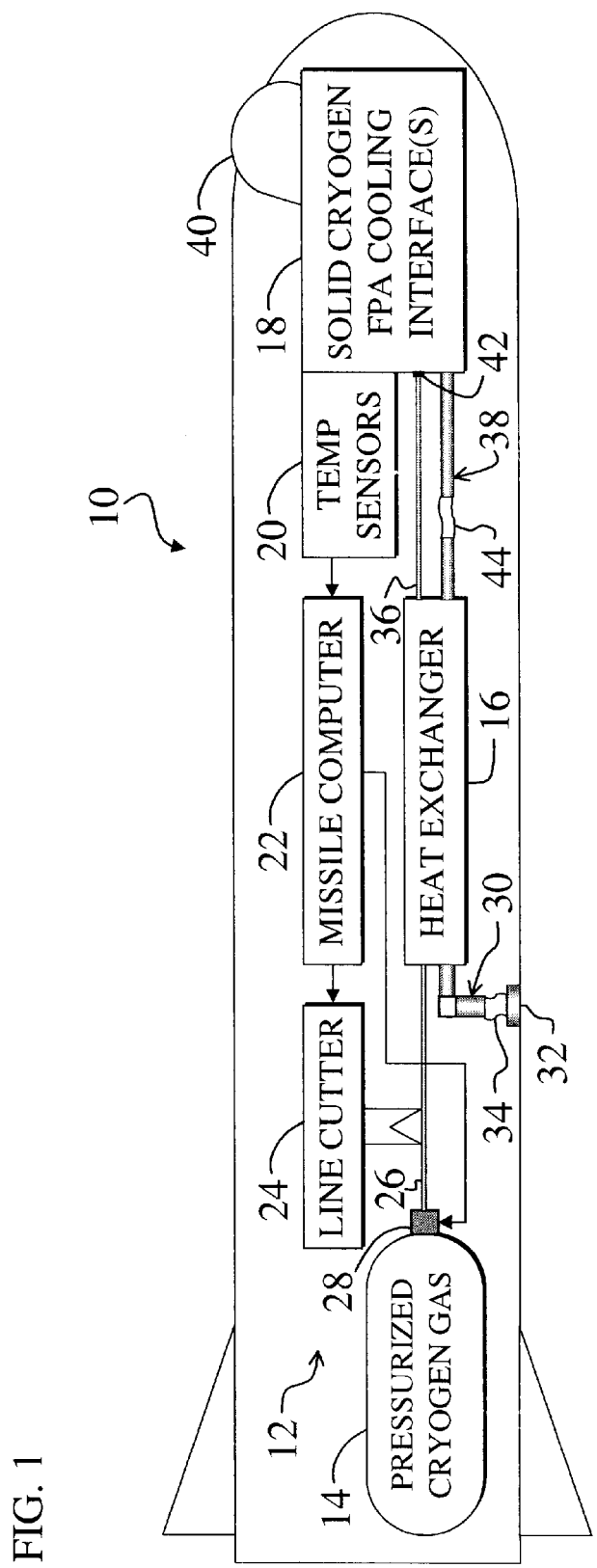
FIG. 1 is a block diagram of a missile system employing a solid cryogen infrared Focal Plane Array (FPA) cooling system constructed in accordance with the teachings of the present invention.

FIG. 1 is a diagram of a missile system 10 employing a solid cryogen infrared Focal Plane Array (FPA) cooling system 12 constructed in accordance with the teachings of the present invention. For clarity, various well-known components, such as power supplies, actuators, heat exchanging coils, explosives compartments, and so on, have been omitted from the figures. However, those skilled in the art with access to the present teachings will know which components to implement and how to implement them to meet the needs of a given application.

The cooling system 12 includes a pressurized cryogen gas canister 14, a heat exchanger 16, a solid cryogen FPA cooling interface 18, temperature sensors 20, a missile computer 22, and a line cutter 24. The heat exchanger 16 is connected to the pressurized cryogen gas canister 14 via a high-pressure input line 26 that is connected to an electrically controlled valve 28 at the output of the gas canister 14. An exhaust output line 30 is connected to the heat exchanger 16 at one end and to a flange 32 at the opposite end. The exhaust flange 32 is attached to a wall of the missile 10 so that exhaust gases may escape from the missile 10. The exhaust output line 30 includes a flexible bellows 34 to provide mechanical and thermal isolation of the heat exchanger 16 from exhaust flange 32 and body of the missile 10. The flexible exhaust bellows 34 may or may not include a pump depending on the demands of a given application.

The heat exchanger 16 is connected to the solid cryogen FPA cooling interface 18 via a flexible output pressure line 36 and an input exhaust line 38. A sensor suite 40 is mounted on the FPA cooling interface 18. One or more temperature sensors 20 provide temperature input to the missile computer 22, which may send control signals to the line cutter 24 and to the electronically actuated cryogen canister valve 28.

In operation, the missile computer 22 activates the cooling system 12 by opening the electrically controlled valve 28 via a control signal sent thereto. Pressurized cryogen gas is then transferred to the heat exchanger 16 via the high-pressure line 26. The pressurized cryogen gas passes through various heat exchanging coils or other heat-exchanging mechanisms in the heat exchanger 16 before being transferred to the FPA cooling interface 18 via the output pressure line 36. On the initial pass, the pressurized cryogen gas is not optimally cooled by the heat exchanger 16, since cooling exhaust gasses have not yet been generated to facilitate cooling of the input cryogen gas.

The pressurized cryogen gas entering the FPA cooling interface 18 passes through a Joule-Thomson orifice 42, where the gas is depressurized as it enters the FPA cooling interface 18. Due to the Joule-Thomson effect, the depressurized gas passing through the FPA cooling interface 18 becomes sufficiently cold to enter a saturated state and liquefy. Any liquid cryogen that is caught in the FPA cooling interface 18 eventually freezes. Remaining gas that has not liquefied in the cooling interface 18 is directed back through the heat exchanger 16 via the input exhaust line 38.

Unlike conventional systems, the heat exchanger 16 is remotely positioned relative to the cryogen FPA cooling interface 18 and accompanying sensor suite 40. This facilitates mounting of the sensor suite 40 and accompanying FPA's via smaller, lighter, and more cost-effective mounting structures.

By connecting the heat exchanger 16 to the FPA cooling interface 18 via the flexible pressure line 36 and the exhaust line 38 having a flexible coupling 44 included therein, the motion and vibration of the relatively heavy heat exchanger 16 is isolated from the sensor suite 40 and accompanying FPA cooling interface 18. Consequently, abrupt missile maneuvers that move the heavy heat exchanger 16 are less likely to disrupt operations of the sensor suite 40. The flexible exhaust coupling 44 may include a pump to facilitate circulation of exhaust gases in the cooling system 12.

Cold cryogen exhaust gas returning from the FPA cooling interface 18 cools incoming pressurized gas in the heat exchanger 16. This process raises the temperature of the exhaust gas, which is directed out of the missile 10 via the output exhaust line 30.

Some depressurized cryogen gas passing through the FPA cooling interface 18 eventually liquefies and then freezes in the FPA cooling interface 18. After cessation of gas flow, the internal pressure of the FPA cooling interface 18 decreases, enabling the liquid to boil and causing the cryogen in the FPA cooling interface 18 to freeze. The solidified cryogen improves temperature stability across the cooled FPA's in the sensor suite 40. The temperature remains relatively constant in time and position across the surface of a cooled FPA. By employing the special cryogen FPA cooling interface 18 to cool an FPA via solid cryogen, both temporal and spatial temperature stability are enhanced. This may significantly enhance the operation of the FPA and accompanying sensor suite 40. This may also simplify nonuniformity correction circuitry and algorithms required to compensate for FPA detector nonuniformities.

In the present specific embodiment, the cryogen gas is Argon. However, other types of cryogen gas, such as Krypton, Nitrogen, Neon, or Hydrogen, may be employed without departing from the scope of the present invention.

Strategically positioned temperature sensors 20 enable software running on the missile computer 22 to determine when the cooling interface 18 has reached a desired temporal and spatial temperature stability and/or uniformity. The software running on the missile computer 22 then actuates the line cutter 24, which cuts the input pressure line 26, enabling the pressurized cryogen gas canister 14 to release from the missile 10. The missile 10 continues flying as frozen cryogen in the FPA cooling interface 18 continues to efficiently cool the FPA's in the sensor suite 40.

Hence, the missile computer 22 runs software to actuate the line cutter 24 when the solid cryogen FPA cooling interface 18 reaches a predetermined temperature and/or spatial and temporal temperature stability and uniformity as determined via the temperature sensors 20. Those skilled in the art with access to the present teachings may easily construct this software without undue experimentation.

Those skilled in the art will appreciate that various modules shown in FIG. 1 may be omitted or replaced with other types of modules without departing from the scope of the present invention. For example, the temperature sensors 20 for determining when to actuate the line cutter 24 may be replaced with a timer or mechanical mechanism to determine when to actuate the line cutter 24. Furthermore, the missile computer 22, the electrically controlled nozzle 28, and/or the line cutter 24 may be omitted in various applications, such as those that do not require the release of the pressurized cryogen gas canister 14 from the missile 10. In addition, some applications may demand that the heat exchanger 16 be released from the missile 10 along with the pressurized cryogen gas canister 14 when sufficient solid cryogen forms in the FPA cooling interface 18. In this implementation, line cutters may be employed to cut the input exhaust line 38 and the output pressure line 36.

A method adapted for use with the missile 10 and accompanying cryogenic cooling system 12 includes the following steps:

1. Launch the missile 10.
2. Open valve 28 to release pressurized cryogen gas from the cryogen gas canister 14 to the heat exchanger 16.
3. Employ the heat exchanger 16 to cool the incoming pressurized gas.
4. Depressurize the gas via a Joule-Thomson orifice 42 to release a freezing fluid in a solid cryogen cooling interface 18 having an integrated infrared FPA that is mounted remotely relative to the heat exchanger 16.
5. Collect any resulting liquefied fluid in the solid cryogen interface 18 adjacent to an IR FPA, directing any remaining cold gaseous fluid (exhaust gas) back through the heat exchanger 16.
6. Use the cold exhaust gas to cool incoming pressurized gas in the heat exchanger 16 before expelling the cool exhaust gas from the missile 10.
7. After a predetermined amount of liquid cryogen is accumulated in the solid cryogen interface 18, cut the pressure line 26 to the cryogen gas canister 14.
8. Release the cryogen gas canister from the missile 10 and allow the liquid cryogen to boil, thereby cooling the cryogen to a solid.

Those skilled in the art will appreciate that some of the above steps may be omitted or interchanged with other steps without departing from the scope of the present invention. For example, the electrically controlled valve 28 at the output of the cryogen gas canister 14 may be opened before the missile 10 is launched, and steps 7 and 8, wherein the cryogen gas canister 14 is released from the missile 10 may be omitted in some applications.

Figure 2:
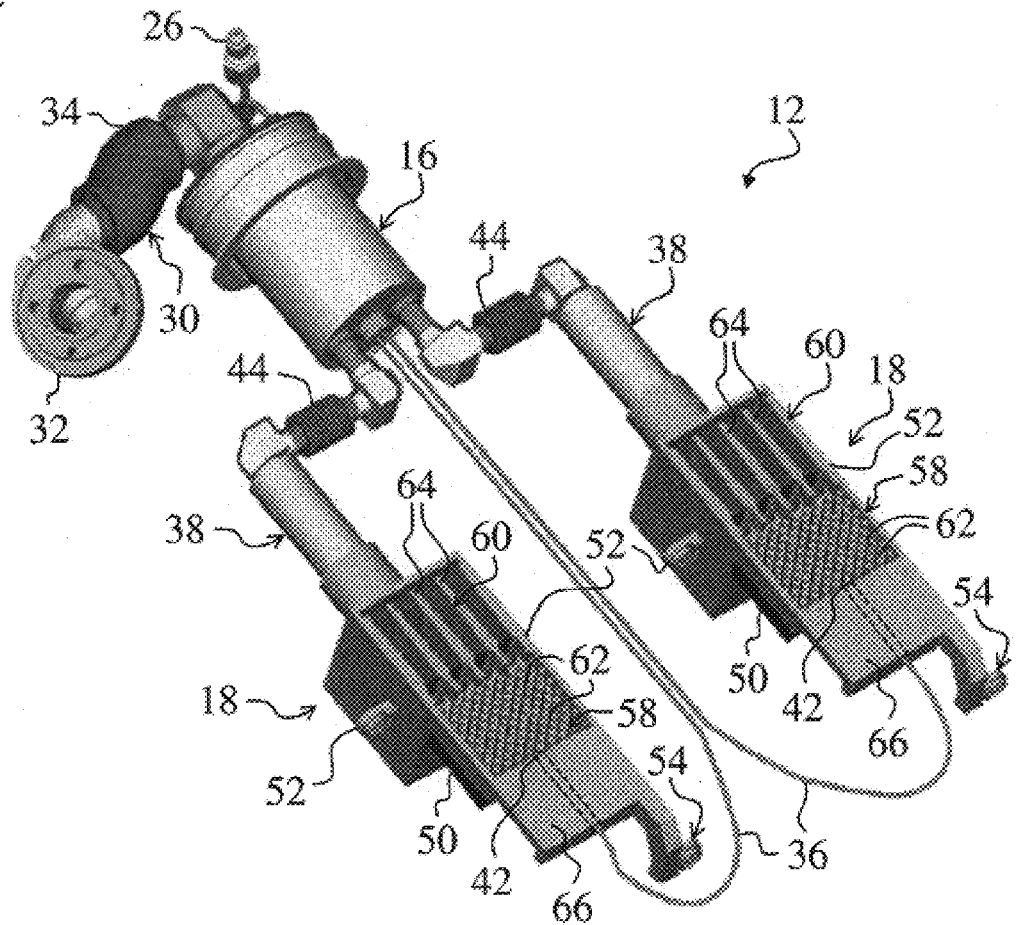
FIG. 2 is a perspective view showing the heat exchanger and solid cryogen cooling interfaces of the solid cryogen cooling system of FIG. 1.

FIG. 2 is a perspective view showing the heat exchanger 16 and two exemplary solid cryogen cooling interfaces 18 of the solid cryogen cooling system 12 of FIG. 1. The input pressure line 26 is split into two output pressure lines 36 within the heat exchanger 16. The output pressure lines 36 are fed to corresponding solid cryogen FPA cooling interfaces 18.

The heat exchanger 16 may be adapted to accommodate several cooling interfaces. To accommodate a third cooling interface (not shown), the input pressure line 26 is separated into three output pressure lines, and the additional line goes to the third cooling interface. In the present specific embodiment, each cooling interface 38 has a separate return exhaust line 38. The separate exhaust lines 38 feed cold exhaust gasses back to the heat exchanger 16 to cool incoming pressurized gas before being expelled from the missile 10 of FIG. 1 via the flexible bellows 34 and flange 32 of the output exhaust line 30. The flex couplings 44 on the input exhaust lines 38 help isolate vibrations and movement of the heat exchanger from focal plane arrays 50 integrated with the cooling interfaces 18.

Remotely positioning the heat exchanger 16 from the cryogen cooling interfaces 18 allows the single heat exchanger 16 to accommodate plural cooling interfaces 18. This results in substantial size, weight, and cost savings, as fewer parts are required, which results in fewer installation, mounting, and FPA alignment problems. The ability to remotely position the heat exchanger 16 relative to the cooling interfaces 18 is facilitated by the use of solid cryogen, which is collected in the cooling interfaces 18. When disposed in the cooling interfaces 18, the solid cryogen provides sufficient spatial (or volumetric) and temporal temperature stability across the infrared FPA's 50 to obviate the need to incorporate the massive heat exchanger 16 into the FPA mounting assembly and cooling interface 18. The efficient design of the cooling interfaces 18 enables the cooling interfaces 18 to act as both infrared FPA mounting assemblies and cooling interfaces. The FPA assemblies 50 are integrated with the cooling interfaces 18.

The cooling interfaces 18 each include two side mounting features 52 and a front mounting feature 54 to facilitate stabilizing the cooling interfaces 18 within the body of the missile 10 of FIG. 1. In the present specific embodiment, the mounting features 52 and 54 are constructed from the same block of material as the cooling interfaces 18. The mounting features may be fitted with thermal insulation to prevent heat from transferring from the missile body to the cooling interfaces 18. Hence, the solid cryogen cooling interfaces 18 efficiently integrate mounting features 52 and 54 and surfaces for mounting the FPA's 50 into single pieces 18.

The cooling interfaces 18 include Joule-Thomson orifices 42, which release pressurized gas from the output pressure lines 36 into the cooling interfaces 18. As the cryogen gas exits the pressure lines 36 and passes into the interfaces 18 via the Joule-Thomson orifices 42, the gas depressurizes sufficiently to initiate partial liquefaction of the cryogen gas in the interfaces 18. Some of the liquefied cryogen is caught in the cooling interfaces 18 where it accumulates. After cessation of gas flow, the pressure in the cooling interfaces 18 is reduced, which allows a portion of the stored cryogenic liquid to boil, thereby cooling the remaining liquid until it freezes.

Each cooling interface 18 has a first cooling section 58 in fluid communication with a second cooling section 60. Input cryogen gas is released from the Joule-Thomson orifice 42 into the first cooling section 58 before passing to the second cooling section 60. For illustrative purposes, top surfaces of the cooling interfaces 18 are removed. In an actual implementation, the first section 58 and second section 60 are enclosed in the cooling interfaces 18. In this realization, all cryogen gas entering the Joule-Thomson orifice 42 and not liquefying in the cooling sections 58 and 60 is transferred via the exhaust line 38 back to the heat exchanger 16. One skilled in the art will appreciate that the exhaust gases exiting from the second cooling section 60 may pass directly out of the missile without passing first through the heat exchanger 16. This may further simplify the configuration of the exhaust line 38 and allow the pressure within the cooling interface 18 to be reduced, thereby allowing the operating temperature of the solid cryogen to be reduced. While the utilization of the high pressure cryogenic gas may be less efficient in this implementation, a lower ultimate operating temperature may be achieved. The lost efficiency may be partially regained by adding a second cryogen gas flow to the heat exchanger 16. This gas flow passes through a Joule-Thompson orifice (not shown) within the heat exchanger 16 and provides cooling of the cryogen gas passing through the heat exchanger 16 and then to the cooling interfaces 18 via the pressure lines 36.

The first cooling section 58 represents a partial indentation in a cooling interface housing 66. The first cooling section 58 is formed in the cooling interface housing 66 opposite the FPA 50, which is mounted on a reverse side of the cooling interface housing 66. The first cooling section 58 includes several pins 62, which are integral to the beryllium cooling interface housing 66. The pins 62 are strategically positioned and shaped to promote efficient thermal transfer between cryogen passing through the first cooling section 58 and the beryllium cooling interface housing 66. The pins 62 form a metal matrix with plural spaces or compartments formed between the pins 62. The plural compartments expand the thermally conductive surface area of the first section 58 and facilitate efficient cooling of the FPA 50. The exact number of pins and the sizes and shapes of the pins 62 are application-specific and may be determined by one skilled in the art with access to the present teachings to meet the needs of a given application.

The second cooling section 60 receives cold cryogen gas from the first cooling section 58. Cryogen gas that has not been trapped as frozen or liquefied cryogen in the first section 58 flows into the second section 60. The second section 60 includes plural flanges 64 designed to optimize thermal transfer between liquid and solid cryogen freezing in the second section 60 and the FPA 50. The plural compartments formed between the flanges 64 ensure that sufficient surface area of the cooling interface 18 contacts the frozen cryogen to achieve optimum FPA temperature stability. The relatively large volume of the second section 60 promotes long hold time and temperature stability of the FPA 50. Those skilled in the art will appreciate that the second section 60 may be omitted in some applications without departing from the scope of the present invention.

The first section 58 and the second section 60 accommodate three-dimensional surfaces formed by the pins 62 and the absorber flanges 64, respectively. The absorber flanges 64 may be replaced with another type of absorbent structure, such as a thermally conductive matrix or mesh absorbent, without departing from the scope of the present invention. For the purposes of the present discussion, a three dimensional surface is a surface that includes a plurality of surface dips, grooves, contours, or compartments for expanding the surface area over that of a substantially flat surface.

The cooling sections 58 and 60 and the infrared FPA 58 are positioned so that cold incoming cryogen gas initially cools the first section 58, thereby cooling the FPA 50 first before being warmed by other features. This improves the efficiency of the cryogen cooling interface 18 by ensuring that the first section 58, which is adjacent to the FPA 50, remains at a spatially and temporally stable cryogenic temperature at or below 80 degrees Kelvin.

The second section 60 of the cooling interfaces 18 eventually contain solid cryogen. Unlike gas or liquid cooling systems, the solid cryogen does not slosh in response to missile maneuvers. Consequently, the cooling interface 18 can provide stable cryogenic temperatures to the FPA, which are stable in time and uniform across a given volume near the FPA 50.

The flanges 64 are brazed to the body of the second section 60. Copper mesh or graphite fiber may be used. The fibrous nature of the material prevents separation of the liquid and wicking material from the housing. A material should be chosen that can be joined to the housing of the cooling interfaces 18. The material should wick the liquid cryogen efficiently to prevent it from being expelled out of the exhaust lines 38 when high-volume cryogen gas flow is occurring.

Those skilled in the art will appreciate that the copper pins 62 in the first cooling section 58 and the cooling flanges 64 in the second section 60 may be replaced with other features without departing from the scope of the present invention. For example, the pins 62 in the first cooling section 58 may be replaced with a sintered or foamed metal matrix, such as a metallic sponge, constructed via a sintering or a metal or graphite foaming process. The pins 62 may represent a copper metal matrix or a carbon/graphite matrix.

Employing frozen cryogen in the efficient solid cryogen cooling interfaces 18 to cool the infrared FPA's 50 allows the heat exchanger 16 to be positioned remotely from the FPA's 50 and corresponding mounting structure 66. The large mass of the heat exchanger 16 is no longer required to increase the temperature stability of the FPA's 50, since the frozen cryogen trapped in the efficient cooling interfaces 18 provides sufficient temperature stability. Unlike the heat exchanger 16, which is connected to the cooling interfaces 18 and FPA assemblies 58 only via the pressure lines 36 and exhaust lines 38 and is mounted separately from the cooling interfaces 18, conventional systems employ one heat exchanger for each FPA to be cooled. In these systems, a heat exchanger is mounted to each FPA assembly and/or cooling interface. This increases installation and parts costs and may create sensor alignment difficulties.

Figure 3:
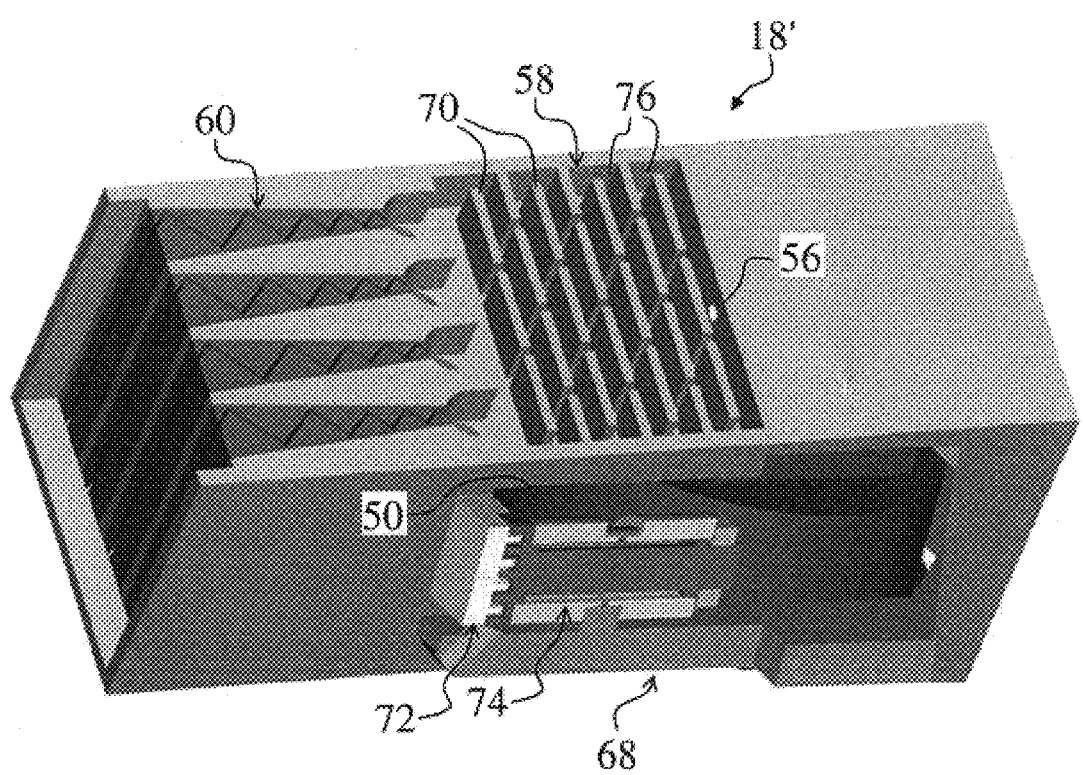
FIG. 3 is a perspective view showing an alternative embodiment of a cryogen cooling interface and accompanying FPA assembly of FIG. 2.

FIG. 3 is a perspective view showing an alternative embodiment of a cryogen cooling interface 18' and accompanying FPA assembly 68. The operation of the cryogen cooling interface 18' is similar to the operation of the cryogen cooling interfaces 18 of FIG. 2 with the exception that the pins 62 of FIG. 2 are replaced with vertically oriented rectangular cooling plates 70, and the infrared FPA 50 of FIG. 2 is replaced with a more elaborate infrared FPA assembly 68. Furthermore, the mounting features 52 and 54 of FIG. 2 are omitted from the cooling interface 18' of FIG. 3. The rectangular cooling plates 70 form various volumetric sections 76 to promote heat transfer away from the FPA assembly 68.

The FPA assembly 68 includes an additional saw-toothed fitting 72 designed to mate with and help stabilize a corresponding FPA assembly support structure 74. In addition, the ridged fitting 72 promotes the conduction of heat away from FPA assembly 68 to the cooling interface 18'. The FPA assembly 68 is efficiently integrated with cooling interface 18' to provide excellent temperature stability.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A cryogenic cooling system for cooling electromagnetic energy detectors comprising first:
   first means for accommodating cryogen fluid in one or more spaces and
   second means for freezing said cryogen fluid in said one or more spaces adjacent to said electromagnetic energy detectors.

2. The system of claim 1 wherein said electromagnetic energy detectors comprise one or more focal plane arrays.

3. The system of claim 2 wherein said second means includes a heat exchanger that is mounted separately from said first means.

4. The system of claim 3 wherein said heat exchanger is adapted to cool plural focal plane arrays.

5. The system of claim 2 wherein said one or more spaces are fitted with three-dimensional surfaces or cryogen absorbents.

6. The system of claim 2 wherein said first means includes a solid cryogen reservoir having a thermally conductive matrix with said one or more spaces formed therein.

7. The system of claim 6 wherein said thermally conductive matrix is a copper metal matrix, and said solid cryogen reservoir is a beryllium reservoir.

8. The system of claim 7 wherein said matrix includes one or more pins or flanges.

9. The system of claim 7 wherein said solid cryogen reservoir includes one or more mounting features and a surface for mounting a focal plane array.

10. The system of claim 6 wherein said second means includes means for employing the Joule-Thomson effect to cool said cryogen fluid from a gas state to a saturated state.

11. The system of claim 10 wherein said first means includes a selectively detachable cryogen canister for providing pressurized cryogen fluid to a heat exchanger, said heat exchanger in fluid communication with said solid cryogen reservoir.

12. The system of claim 11 wherein said heat exchanger is positioned remotely from said cryogen reservoir.

13. The system of claim 12 wherein said heat exchanger is a single heat exchanger that outputs cooled cryogen gas to plural solid cryogen reservoirs to cool plural corresponding infrared focal plane arrays.

14. The system of claim 1 wherein said cryogenic cooling system is mounted on or within a missile system and is adapted to cool an infrared focal plane array.

15. The system of claim 14 wherein said cryogenic cooling system includes a cryogen canister and a heat exchanger for providing said cryogen fluid to a cryogen reservoir incorporating said one or more spaces and employing the Joule-Thomson effect to produce liquid cryogen that is later frozen in the reservoir.

16. The system of claim 15 wherein said heat exchanger is positioned separately from said reservoir and employs a conduit to direct said cryogen fluid to said cryogen reservoir.

17. The system of claim 16 wherein said heat exchanger feeds plural cryogen cooling interfaces attached to plural corresponding infrared focal plane arrays.

18. The system of claim 17 further including means for selectively detaching said gas canister and said heat exchanger from said missile after a predetermined amount of said cryogen fluid is within said cryogen reservoir or after a predetermined time interval.

19. A cryogenic cooling system for cooling electromagnetic energy detectors comprising:
   first means for accommodating cryogen fluid in a space having a three-dimensional thermally conductive surface and
   second means for freezing said cryogen fluid in said space adjacent to said electromagnetic energy detectors, said second means employing a heat exchanger for initiating cooling of said cryogen fluid, said heat exchanger positioned remotely from said first means.

20. The system of claim 19 wherein said heat exchanger is adapted to provide said cryogen fluid to plural spaces associated with different cooling interfaces included in said first means for cooling plural focal plane arrays.

21. The system of claim 20 wherein said second means includes a Joule-Thomson orifice.

22. A cryogenic cooling system for cooling an array of detectors comprising:
   first means for maintaining a cryogen fluid at a first pressure and selectively outputting said cryogen fluid at a second pressure sufficiently lower than said first pressure to promote conversion of said cryogen fluid to a solid state and
   second means for receiving said cryogen fluid output from said first means and maintaining said cryogen fluid in plural adjacent volumetric sections next to said array of detectors as said cryogen fluid freezes.

23. The system of claim 22 wherein said first means includes a cryogen canister that is selectively detachable from said cryogenic cooling system.

24. The system of claim 23 wherein said first means includes a heat exchanger.

25. The system of claim 24 wherein said second means includes a cryogen cooling interface abutting an infrared focal plane array, said cryogen cooling interface mounted separately from said heat exchanger.

26. A cryogenic cooling system for cooling an infrared focal plane array of detectors comprising:
   a heat exchanger for removing sufficient heat from a cryogen fluid to promote liquefaction of said cryogen fluid, said heat exchanger positioned remotely from said infrared focal plane array of detectors and
   a cooling interface adjacent to said infrared focal plane array of detectors and in fluid communication with said heat exchanger, said cooling interface having a space with a three-dimensional surface designed to accommodate said cryogen fluid as said cryogen fluid transforms to a solid state.

27. A cooling arrangement for a focal plane array of detectors, said arrangement comprising:
   a cooling interface thermally coupled to said focal plane array and
   frozen cryogen disposed within said cooling interface.

28. The invention of claim 27 wherein said arrangement further includes means for maintaining said cryogen in a frozen solid state.

29. A cryogenic cooling system for cooling electromagnetic energy detectors comprising:
   first means for accommodating cryogen fluid in one or more spaces, said first means thermally coupled to said electromagnetic energy detectors and
   second means for freezing said cryogen fluid in said one or more spaces.

30. A method for cooling electromagnetic energy detectors to cryogenic temperatures comprising:
   accommodating cryogen fluid in one or more spaces and
   freezing said cryogen fluid in said one or more spaces adjacent to said electromagnetic energy detectors.

* * * * *